United States Patent
Lefebvre et al.

(10) Patent No.: US 7,477,794 B2
(45) Date of Patent: Jan. 13, 2009

(54) MULTI-LEVEL IMAGE STACK OF FILTERED IMAGES

(75) Inventors: Sylvain Lefebvre, Bellevue, WA (US); Hugues H. Hoppe, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 385 days.

(21) Appl. No.: 11/171,920

(22) Filed: Jun. 30, 2005

(65) Prior Publication Data

US 2007/0003152 A1 Jan. 4, 2007

(51) Int. Cl.
*G06K 9/46* (2006.01)
*G06K 9/54* (2006.01)

(52) U.S. Cl. .......................... 382/240; 382/254; 382/302

(58) Field of Classification Search ................. 382/254, 382/240, 302
See application file for complete search history.

(56) References Cited

U.S. PATENT DOCUMENTS

| | | | |
|---|---|---|---|
| 5,388,517 A * | 2/1995 | Levien | 101/485 |
| 5,680,528 A * | 10/1997 | Korszun | 345/630 |
| 5,740,277 A | 4/1998 | Katto | |
| 5,774,129 A | 6/1998 | Poggio et al. | |
| 5,784,498 A | 7/1998 | Venable | |
| 5,872,867 A | 2/1999 | Bergen | |
| 5,974,198 A * | 10/1999 | Hamburg et al. | 382/284 |
| 6,185,342 B1 * | 2/2001 | Hamburg et al. | 382/284 |
| 6,392,655 B1 | 5/2002 | Migdal | |
| 6,525,744 B1 | 2/2003 | Poggio et al. | |
| 6,593,933 B1 | 7/2003 | Xu | |
| 6,700,585 B2 | 3/2004 | Ritter | |

(Continued)

FOREIGN PATENT DOCUMENTS

JP 9044655 2/1997

(Continued)

OTHER PUBLICATIONS

Aiazzi et al., "Pryamid-based multiresolution adaptive filters for additive and multiplicative image noise," IEEE Transactions on Circuits and Systems, vol. 45, No. 8, pp. 1092-1097 (Aug. 1998).*

(Continued)

*Primary Examiner*—Samir A Ahmed
*Assistant Examiner*—Stephen R Koziol
(74) *Attorney, Agent, or Firm*—Lyon & Harr, L.L.P.; Craig S. Fischer

(57) ABSTRACT

A multi-level image data structure (called a multi-level image stack) containing a single image at each level and a method for generating the same. Images at each level contain the same number of pixels. The multi-level image stack defines a set of levels emanating from an original image having a number of pixels. Each successive level of the multi-level image stack contains a single image. Each single image contains the same number of pixels as the original image. Successive levels encode progressively filtered information of the original image, but without subsampling. This retains the fine-scale resolution of the original image. A variety of filter techniques can be used, including a Gaussian filter and a box filter. The multi-level image stack is particularly well-suited for use in texture synthesis applications, where its fine-scale resolution at all levels has the advantage of reducing artifacts and spatial quantization.

20 Claims, 12 Drawing Sheets

U.S. PATENT DOCUMENTS

| | | | |
|---|---|---|---|
| 6,762,769 | B2 | 7/2004 | Guo et al. |
| 6,888,544 | B2 | 5/2005 | Malzbender et al. |
| 6,965,694 | B2 | 11/2005 | Ueda et al. |
| 6,999,095 | B2 | 2/2006 | Wang et al. |
| 7,002,591 | B1 | 2/2006 | Leather et al. |
| 7,088,375 | B1 * | 8/2006 | Hamburg ..................... 345/629 |
| 7,254,271 | B2 * | 8/2007 | Aguera y Arcas ........... 382/232 |
| 2002/0122043 | A1 | 9/2002 | Freeman |
| 2002/0171660 | A1 | 11/2002 | Luo et al. |
| 2003/0164838 | A1 | 9/2003 | Guo |
| 2003/0179923 | A1 | 9/2003 | Xiong |
| 2004/0075666 | A1 | 4/2004 | Ritter |
| 2004/0096120 | A1 | 5/2004 | Tong |
| 2004/0233211 | A1 | 11/2004 | Wang |
| 2004/0234159 | A1 | 11/2004 | Wang |
| 2005/0013509 | A1 | 1/2005 | Samadani |
| 2005/0253863 | A1 | 11/2005 | Mitchell et al. |
| 2006/0001679 | A1 * | 1/2006 | Hamburg ..................... 345/620 |
| 2006/0028481 | A1 | 2/2006 | Zhang et al. |

FOREIGN PATENT DOCUMENTS

| | | |
|---|---|---|
| WO | WO2004055724 | 1/2004 |

OTHER PUBLICATIONS

Adelson, E. H., C. H. Anderson, J. R. Bergen, P. J. Burt and J. M. Ogden, Pyramid methods in image processing, *RCA Engineer*, Nov./Dec. 1984, vol. 29, No. 6, pp. 33-41.

Ashikhmin, M., Synthesizing natural textures, *Symposium on Interactive 3D Graphics*, pp. 217-226.

Bar-Joseph, Z., El-Yaniv, R., Lischinski, D., and Werman, M. 2001, Texture mixing and texture movie synthesis using statistical learning, *IEEE TVCG*, vol. 7 No. 2, pp. 120-135.

Burt, P. J., E. Adelson, The Laplacian Pyramid as a compact image code, *IEEE Transactions on Communications*, Apr. 1983, vol. com-31 No. 4, pp. 532-540.

Cohen, M., J. Shade, S. Hiller, and O. Deussen, 2003, Wang tiles for image and texture generation, *ACM SIGGRAPH*, pp. 287-294.

De Bonet, J., Multiresolution sampling procedure for analysis and synthesis of texture images, *ACM SIGGRAPH*, pp. 341-346.

Garber, D., *Computational Models for Texture Analysis and Texture Synthesis*. PhD thesis, University of Southern California, 1981.

Kwatra, V., A. Schödl, 1. Essa, G. Turk, and A. Bobick, Graphcut textures: Image and video synthesis using graph cuts, *ACM SIGGRAPH*, 2003, pp. 277-286.

Lefebvre, S., and F. Neyret, Pattern based procedural textures, *Symposium and Interactive 3D Graphics*, 2003, pp. 203-212.

Liang, L., C. Liu, Y. Xu, B. Guo, and H.-Y. Shum, Real-time texture synthesis by patch-based sampling, 2001, *ACM TOG*, vol. 20, No. 3, 127-150.

Liu, Y., W.-C. Lin, and J. Hays, Near-regular texture analysis and manipulation, *ACM SIGGRAPH*, 2004, pp. 368-376.

Liu, Y., Y. Tsin, and W.-C. Lin, The promise and peril of near-regular texture, *IJCV*, vol. 62, No. 1-2, pp. 149-159.

Tanner, C., C. Migdal, and M. Jones, The clipmap: A virtual mipmap, *ACM SIGGRAPH*, 1998, pp. 151-158.

Tong, X., J. Zhang, L. Liu, X. Wang, B. Guo and H.-Y. Shum, Synthesis of bidirectional texture functions on arbitrary surfaces, 2002, *ACM SIGGRAPH*, pp. 665-672.

Tonietto, L., and M. Walter, Towards local control for image-based texture synthesis, *Proceedings of the 15th Brazilian Symposium on Comp. Graphics and Image Processing SIBGRAPHI*, 2002, pp. 252-258.

Wei, L.-Y. and M. Levoy, Fast texture synthesis using tree-structured vector quantization, *ACM SIGGRAPH*, 2000, pp. 479-488.

Wei, L.-Y. and M. Levoy, Order-independent texture synthesis, http://graphics.stanford.edu/papers/texture-synthesis-sig03/, Rejected from *SIGGRAPH* 2003.

Wei, L.-Y., Tile-based texture mapping on graphics hardware, *Graphics Hardware*, 2004, pp. 55-64.

Zalesny, A., V. Ferrari, G. Caenen, and L. Van Gool, Composite texture synthesis, *IJCV*, 2005, vol. 62, No. 1-2, pp. 161-176.

Zhang, J., K. Zhou, L. Velho, B. Guo, and H.-Y. Shum, Synthesis of progressively-variant textures on arbitrary surfaces, 2003, *ACM SIGGRAPH*, pp. 295-302.

Co-pending U.S. Appl. No. 11/172,593, Parallel texture synthesis having controllable jitter, filed Jun. 30, 2005.

Co-pending U.S. Appl. No. 11/172,594, Sub-pass correction using neighborhood matching, filed Jun. 30, 2005.

Co-pending U.S. Appl. No. 11/174,231, Parallel texture synthesis by unsampling pixel coordinates controllable jitter, filed Jun. 30, 2005.

Co-pending U.S. Appl. No. 11/171,923, Magnification of indirection textures, filed Jun. 30, 2005.

Cula, O.G. and K. J. Dana, Recognition Methods for 3D Textured Surfaces, available at http://www.ece.rutgers.edu/~kdana/research/spie01.pdf.

Efros, A., and T. Leung, Texture synthesis by non-parametric sampling, ICCV, 1999, pp. 1033-1038.

Fatahalian, K., Real-Time Global Illumination of Deformable Objects, available at http://graphics.stanford.edu/~kayvonf/papers/seniorthesis03.pdf.

Gralewski, L., N. Campbell, Statistical synthesis of facial expressions for the portrayal of emotion available at http://delivery.acm.org/10.1145/990000/988867/p190-gralewski.pdf?key1=988867&key2=9951194411&coil=GUIDE&dl=GUIDE&CFID=69372413&CFTOKEN=85977336.

Hertzmann, A., C. Jacobs, N. Oliver, B. Curless and D. Salesin, Image analogies, ACM SIGGRAPH, 2001, pp. 327-340.

Hertzmann, A., and D. Zorin, Illustrating smooth surfaces, ACM SIGGRAPH, 2000, pp. 517-526.

Kwatra, V., I. Essa, A. Bobick, and N. Kwatra, Texture optimization for example-based synthesis, ACM SIGGRAPH, 2005, pp. 795-802.

Lai, Y.-K., S.-M. Hu, D. Gu, and R. Martin, Geometric texture synthesis and transfer via geometry images, Proc. of SMA, 2005, pp. 15-26.

Lefebvre, S., and H. Hoppe, Parallel controllable texture synthesis, ACM SIGGRAPH, 2005, pp. 777-786.

Leung, T., and Malik, J., Representing and recognizing the visual appearance of materials using three-dimensional textons, IJCV, vol. 43, No. 1, 2001, pp. 29-44.

Magda, S., and D. Kriegman, Fast texture synthesis on arbitrary meshes, Eurographics Symposium on Rendering, 2003, pp. 82-89.

Malik, J., S. Belongie, J. Shi, and T. Leung, Textons, contours and regions: Cue integration in image segmentation, ICCV, 1999, pp. 918-925.

Neyret, F., and M.-P. Cani, Pattern-based texturing revisited, ACM SIGGRAPH, 1999, pp. 235-242.

Neyret, F., Advected textures, Symposium on computer animation, 2003, pp. 147-153.

Popat, K., and Picard, R., Novel cluster-based probability model for texture synthesis, classification, and compression, Visual Communications and Image Processing, 1993, pp. 756-768.

Praun, E., A. Finkelstein, and H. Hoppe, Lapped textures, ACM SIGGRAPH, 2000, pp. 465-470.

Roweis, S., EM algorithms for PCA and SPCA, NIPS, 1997, pp. 626-632.

Roweis, S., and L. Saul, Nonlinear dimensionality reduction by locally linear embedding, Science, 2000, vol. 290, pp. 2323-2326.

Sloan, P.-P., Liu, X., , H.-Y. Shum and J. Snyder, Bi-scale radiance transfer, ACM SIGGRAPH, 2003, pp. 370-375.

Soler, C., M.-P. Cani, and A. Angelidis, Hierarchical pattern mapping, ACM SIGGRAPH, 2002, pp. 673-680.

Tenebaum, J., V. de Silva, and J. Langford, a global geometric framework for nonlinear dimensionality reduction, Science, 2000, vol. 290, pp. 2319-2323.

Turk, G., Texture synthesis on surfaces, ACM SIGGRAPH, 2001, pp. 347-354.

Turk, G., Generating textures on arbitrary surfaces using reaction-diffusion, Proceedings of the 18th Annual Conf. on Comp. Graphics and Interactive Techniques, 1991, pp. 289-298.

Wang, L., X. Gu, K. Mueller and S.-T. Yau, Uniform texture synthesis and texture mapping using global parameterization, J. The Visual Comp., pp. 801-810.

Wei, L.-Y., and M. Levoy, Texture synthesis over arbitrary manifold surfaces, ACM SIGGRAPH, 2001, pp. 355-360.

Wu, Q., and Y. Yu, Feature matching and deformation for texture synthesis, ACM SIGGRAPH, 2004, pp. 362-365.

Ying, L., A. Hertzmann, H. Biermann, and D. Zorin, Texture and shape synthesis on surfaces, Eurographics Workshop on Rendering, 2001, pp. 301-312.

Aaron M. Guertin, Office Action, U.S. Appl. No. 11/172,593, Mailed Sep. 13, 2007.

Aaron M. Guertin, Office Action, U.S. Appl. No. 11/172,594, Mailed Oct. 15, 2007.

Wesner Sajous, Office Action, U.S. Appl. No. 11/171,923, Mailed Aug. 24, 2007.

Co-pending U.S. Appl. No. 11/428,311, Anisometric texture synthesis, filed Jun. 30, 2006.

Co-pending U.S. Appl. No. 11/426,564 Texture synthesis using dimensionality-reduced appearance space, filed Jun. 26, 2006.

Co-pending U.S. Appl. No. 11/428,355, Synthesis of advecting texture using adaptive regeneration, filed Jun. 30, 2006.

\* cited by examiner

Exemplar

Level 0
Level 1

Level 4

Level 5

Level 6

MULTI-LEVEL IMAGE STACK OF FILTERED IMAGES

BACKGROUND

Image pyramids are used by many types of image-processing applications. An image pyramid is a representation of an image at different resolutions, where the same downsampling filter is used to go from a finer image to a coarser image within the pyramid. One popular type of image pyramid is a mipmap pyramid. The mipmap pyramid is a hierarchy of filtered versions of an original image, such that successive levels correspond to filtered frequencies. In other words, the mipmap pyramid decomposes an image into a series of filtered images. A filter is applied to a finer level, and then that level is subsampled to form the next coarser level. When stacked one on top of another this series of filtered images forms a pyramid structure.

The mipmap pyramid can use a variety of filters, including a box filter and a Gaussian filter. A Gaussian pyramid is a special case of the mipmap pyramid, and occurs when using a Gaussian filter. Usually, better-quality pyramids are obtained when using a more complex filter, such as a Gaussian filter, which uses a broader set of samples than the box filter.

FIG. 1 illustrates a mipmap pyramid 100 having four levels, namely, Level 0, Level 1, Level 2, and Level 3. Level 3 represents a sample image at the finest resolution level, which is also called an original image or given image. Pixels at Level 3 are downsampled to produce pixels at Level 2, where Level 2 has fewer pixels than Level 3. This is repeated for successively higher levels in the pyramid 100 until a single pixel remains (Level 0 in FIG. 1), which is the original image blurred to a single pixel.

By way of example, the fine-scale original image at Level 3 in FIG. 1 has a size of 8×8 (or $8^2$). To obtain Level 2, the pixels of Level 3 are downsampled by a factor of 2. As shown in FIG. 1, this means that the number of pixels in Level 2 is $4^2$. For example, if the downsampling filter is a box filter, the downsampling operation from Level 3 to Level 2 involves taking 4 Level 3 pixels 110 and averaging these pixels to obtain a single pixel 120 in Level 2. As stated above, if a more complex filter such as a Gaussian filter is used, a broader set of samples is required. Increasingly coarser levels are obtained by repeating this downsampling such that, for example, Level 1 contains $2^2$ pixels and Level 0 contains a single pixel ($1^2$). As stated above, this pixel represents the original image blurred to a single pixel.

A pixel at a coarse level, therefore, contains the result of applying the filter to a larger number of pixels at the finest level. For example, the four pixels of the second coarsest level of a mipmap pyramid contain the result of the filter applied to each four quadrants of the initial image. Each successively coarser level corresponds to applying the filter to a larger window of the finest level.

FIG. 2 illustrates an example in one-dimension (1-D) of the downsampling of the mipmap pyramid 100 shown in FIG. 1. In FIG. 2, an example of filtering using a box filter is shown in order to simplify the figure. In the box filtering example shown in FIG. 2, in order to produce a pixel 210 in Level 2, pixel 220 and pixel 230 in Level 3 are used. Similarly, to produce a pixel 240 in Level 1, pixel 210 and pixel 250 in Level 2 are used. And, to produce the coarsest level pixel 260 in Level 0, pixel 240 and pixel 270 in Level 1 are used.

One drawback of the mipmap pyramid is that a coarser level only contains the result of the filter applied at quantized locations within the finest resolution image. The second coarsest level will contain information for the filter applied to the four quadrants, but it is not possible to obtain information for a filter of a same size (a quarter of the image) applied to any other locations. Depending on the application, this can lead to artifacts. In particular, with multi-resolution texture synthesis, significant features tend to appear at quantized locations. This is called spatial quantization.

FIG. 3 illustrates an example of this spatial quantization that occurs when using a mipmap pyramid in a texture synthesis application. A synthesized texture 300 is formed using an exemplar 310 having a size of $64^2$ pixels. It should be noted that in the context of texture synthesis, an original image is referred to as an exemplar. In this case, the mipmap pyramid has six levels (Levels 0 to 6). A significant feature of the exemplar 310 is a red dot 320. It can be seen that the red dot 320 appears in the synthesized texture 300 multiple times but only at quantized spatial locations. This is due to the spatial quantization resulting from the mipmap pyramid.

One current texture synthesis algorithm introduces a quadtree pyramid for uses in texture synthesis instead of a mipmap pyramid. The quadtree pyramid is a data structure for hierarchical search of image data. With the quadtree pyramid, an image is divided into four quadrants or nodes, with each of the nodes having four children nodes. The quadtree pyramid uses an array of multiple smaller images at each level in the quadtree pyramid rather than a single image at each level. Because the quadtree samples are not spatially continuous, however, neighboring relationships between pixels are non-continuous and there are quantized jumps between multiple images. This makes pixel addressing difficult and complex.

SUMMARY

The invention disclosed herein includes a multi-level image data structure (called a multi-level image stack) containing a single image at each level and a method for generating the same. Images at each level contain the same number of pixels. The multi-level image stack defines a set of levels each containing a single image. Successive levels encode progressively filtered information of the original image, but without subsampling. This retains the fine-scale resolution of the original image.

The multi-level image stack is a data structure that has fine-scale resolution even at the coarser levels. The multi-level image stack contains an original image having a number of pixels. Levels of images are "stacked" on the original image to form the image stack. The successive levels of images each contain a single image, and these images each have the same number of pixels as the original image.

A generation method is used to generate the multi-level image stack. The multi-level image stack generation process includes filtering process used to obtain successive levels. Unlike many existing techniques, this filtering process does not use subsampling. A variety of filter techniques can be used, including a Gaussian filter, which uses a Gaussian curve to form a weighted average of the pixels, and a box filter, which uses a uniform average of the pixels.

A level adjacent the original image is generated by filtering adjacent pixels in the original image. Other levels are generated by filtering pixels that are separated by a separation number of pixels that increases by a factor of two each time another level is generated. For example, at a level of the original image (Level 3 or L in FIG. 7), the separation number of pixels is one (meaning that the pixels are one pixels apart), and thus adjacent pixels are filtered. At the next level (Level 2 in FIG. 7), the separation number of pixels equals two, such that the pixels being filtered are two pixels apart. And at the next level (Level 1 in FIG. 7), the separation number of pixels is four, such that the pixels being filtered are four pixels apart.

As successive levels of the multi-level image stack are generated, the width of the filter being applied may be wider than the stack. This gives rise to the need to augment the stack with additional samples. This is known as "padding". The number of padding pixels needed depends on the type of filter being used. For example, in general more padding pixels are needed when using a Gaussian filter that when using a box filter.

DRAWINGS DESCRIPTION

Referring now to the drawings in which like reference numbers represent corresponding parts throughout:

DETAILED DESCRIPTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Image pyramids are in a variety of image processing environments to represent an original image at different resolutions. On popular type of image pyramid is a mipmap pyramid, which is a hierarchy of filtered images. When stacked one on top of another this series of images forms a pyramid structure.

The mipmap pyramid, however, has several drawbacks. One drawback is that it is not possible to obtain information for a filter of the same size (such as a quarter of the image) applied to any other locations. This lead to artifacts and, when used in texture synthesis application, spatial quantization. Spatial quantization causes significant features present in the original image to appear at only certain quantized locations in a synthesized texture output. One data structure that attempts to alleviate this problem is quadtree pyramid, which uses an array of multiple smaller images at each level in the pyramid. However, because the quadtree samples are not spatially continuous, one drawback is that neighboring relationships between pixels are non-continuous and there are quantized jumps between multiple images. This makes pixel addressing difficult and complex.

The multi-level image stack and generation method disclosed herein overcomes these and other drawbacks of current pyramid image data structures by defining a multiple level image data structure containing filtered images. An original image having a number of pixels is used as a starting point. Each successive level of the multi-level image stack contains a single image, with each single image containing the same number of pixels as the original image. The multi-level image stack is superior to existing image data structures, and overcomes the spatial quantization and other drawbacks of the mipmap pyramid and the addressing complexity and other drawbacks of the quadtree pyramid.

II. Structural Overview

The structure of the multi-level image stack disclosed herein now will be discussed. In order to more fully understand the structure of the multi-level image stack, details of exemplary embodiments are presented. However, it should be noted that these exemplary embodiments are only a few of several ways in which the structure of the multi-level image stack may be implemented and used.

Figure 4:
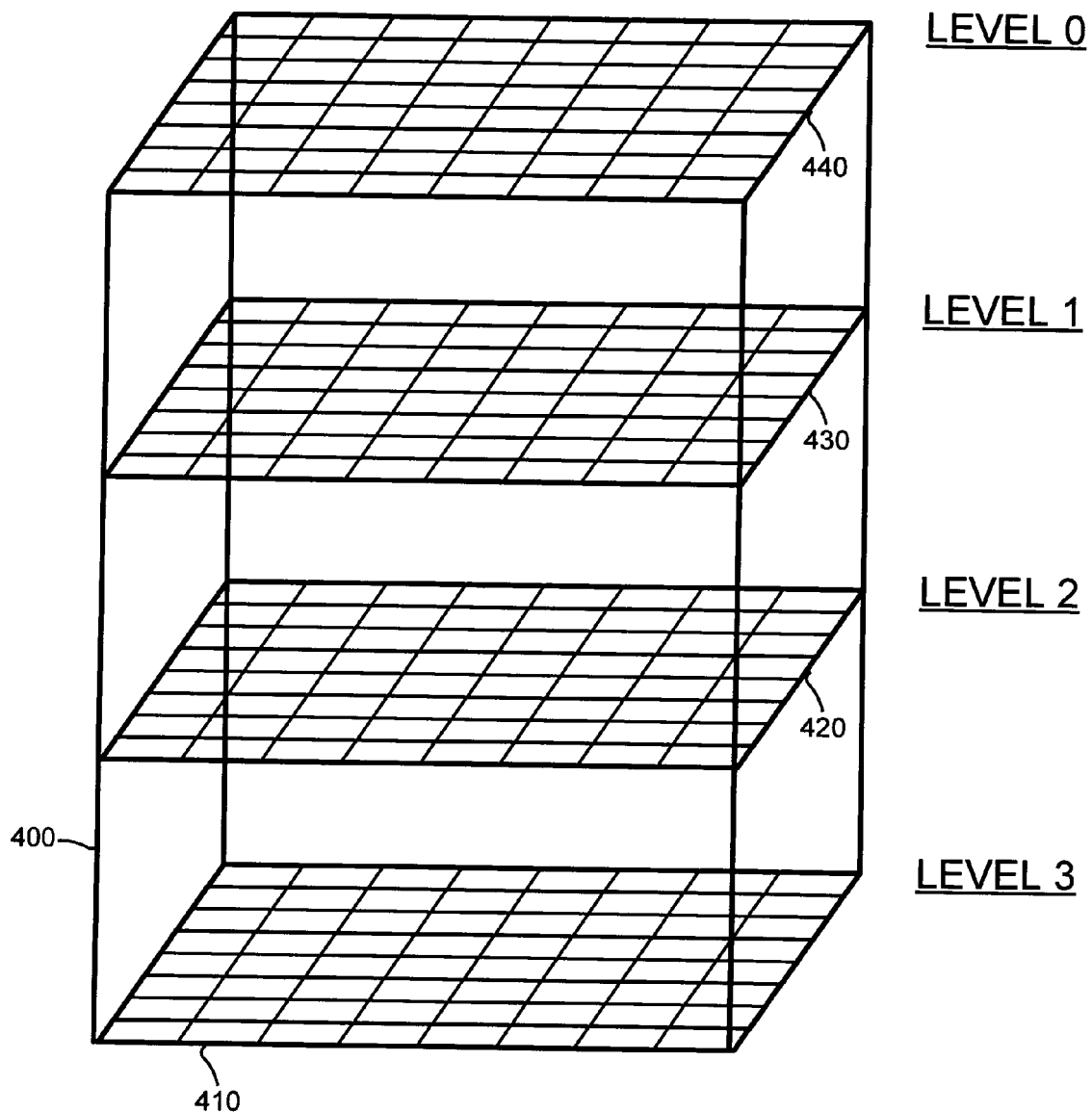
FIG. 4 is a block diagram illustrating an example of a multi-level image stack.

FIG. 4 is a block diagram illustrating an example of a multi-level image stack generated by the multi-level image stack generation method discussed below. A multi-level image stack 400 is shown having four levels. An original image 410 is located at Level 3, and in this example has a size of 8×8 pixels (or $8^2$). It should be noted that each block in FIG. 4 represents a pixel. At Level 2, a first image 420 has the same number of pixels as the original image, namely $8^2$ pixels. The first image 420 is one image, and not multiple images. In addition, the first image 420 has less information that the original image 410. For example, when the filter is a Gaussian filter, the first image 420 does have lower-frequency information than the original image 410.

At Level 1, a single second image 430 has the same number of pixel ($8^2$) as the original image 410. In addition, the second image 430 has less information than the second image 420 and the original image 410. Moreover, a single third image 440 at Level 0 has the same number of pixels ($8^2$) as the original image. The third image 440 also has less information than the second image 430, first image 420, and the original image 410. Since Level 0 is the coarsest level, the information at Level 0 represents the average of all the $8^2$ pixels in the original image.

Figure 1:
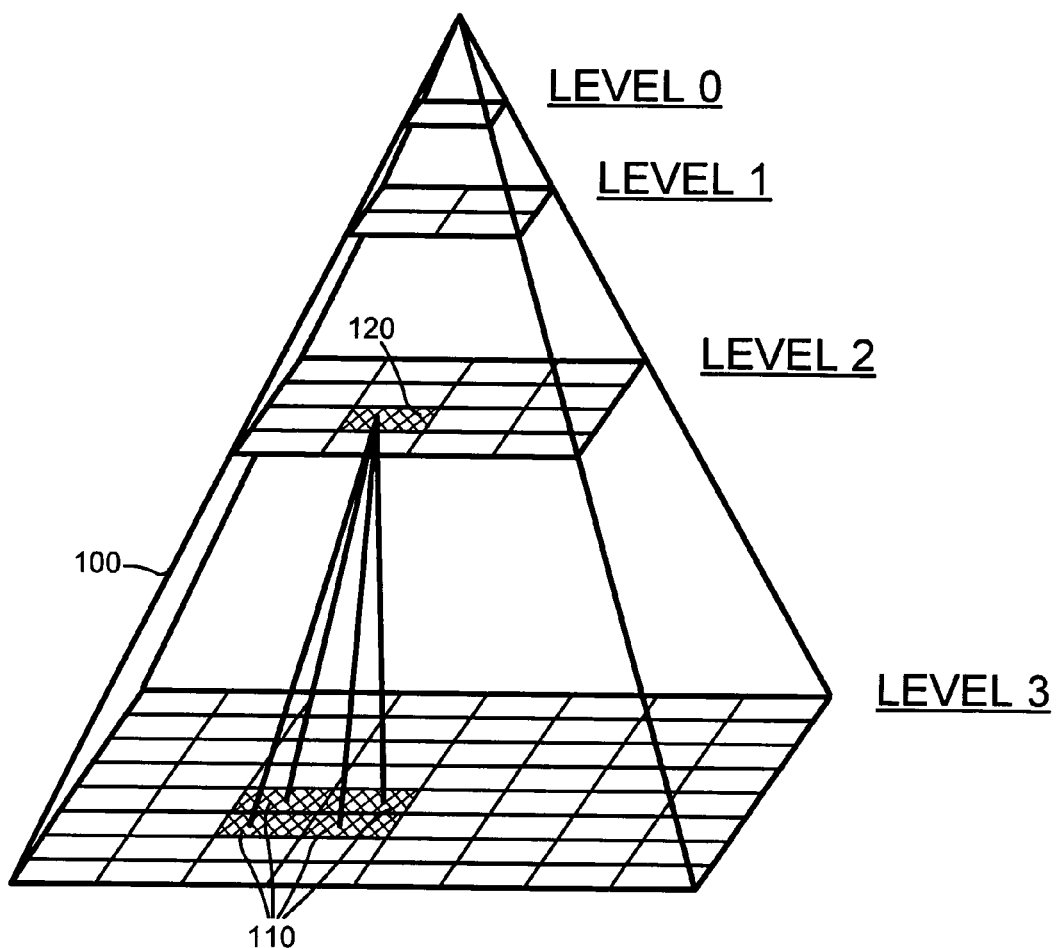
FIG. 1 is a block diagram illustrating a prior art mipmap pyramid having four levels.

By comparing the multi-level image stack 400 shown in FIG. 4 with the mipmap pyramid 100 shown in FIG. 1, the structural differences between the two become apparent. In both cases, the two structures each have four levels. In addition, in both examples each structure has as Level 3 (a beginning level) an original image containing $8^2$ pixels. However, at Level 2 it can be seen that the mipmap pyramid 100 contains only $4^2$ pixels, whereas the multi-level image stack 400 still contains $8^2$ pixels. Moreover, at Levels 1 and 0 the mipmap pyramid contains a progressively lower number of pixels, while the multi-level image stack 400 still has $8^2$ pixels at each of these levels, even the coarsest level, Level 0. This allows the multi-level image stack 400 to retain its fine-scale resolution of the original image 410, even at the coarsest level.

III. Operational Overview

Figure 5:
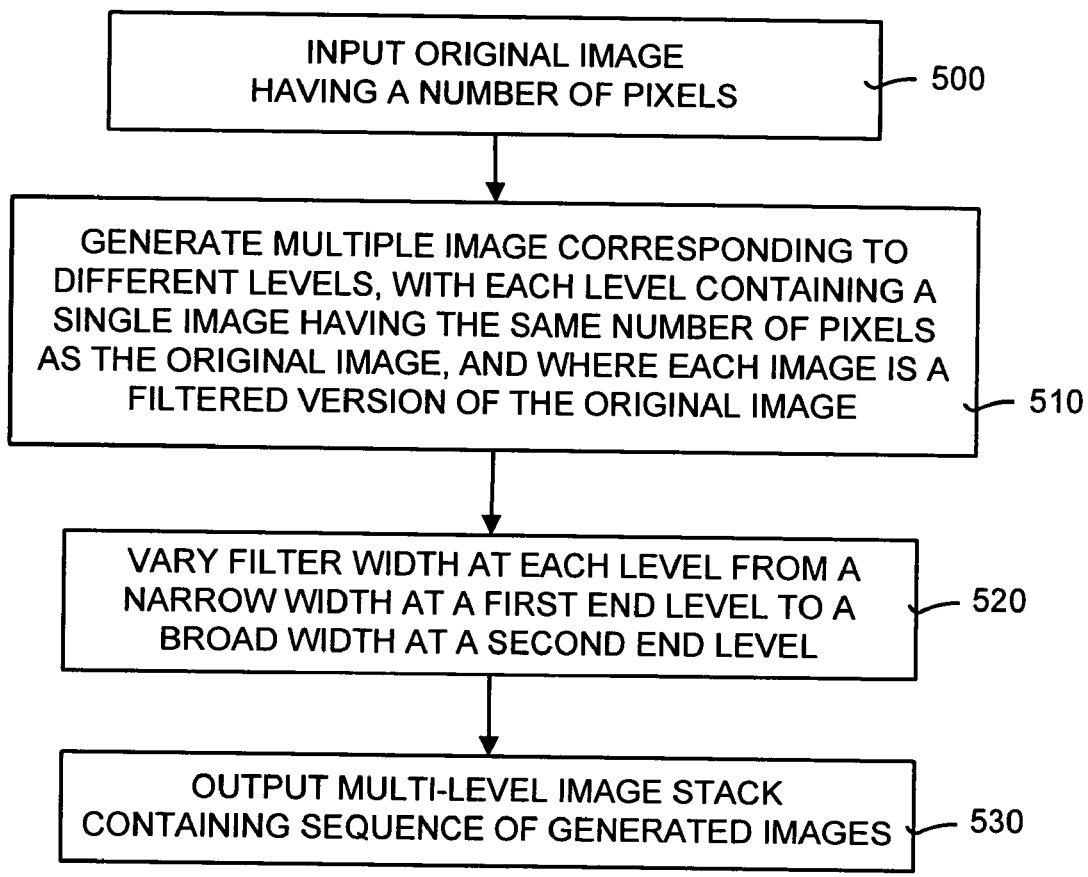
FIG. 5 is a general flow diagram illustrating the multi-level image stack generation method for generating a multi-level image stack, such as is shown in FIG. 4.

FIG. 5 is a general flow diagram illustrating the multi-level image stack generation method for generating a multi-level image stack, such as is shown in FIG. 4. In general, the multi-level image stack generation method is used to generate a multi-level image stack having a single filtered image at each level. The method obtains an original image and generates images at each level of the image stack that contain the same number of pixels. This allows each image of the image stack to retain fine-scale resolution of the original image at each level. This retained fine-scale resolution at all levels has the advantage of reducing artifacts (as compared to existing image data structures) and, in the context of texture synthesis, reducing spatial quantization.

In particular, as shown in FIG. 5, the multi-level image stack generation method begins by receiving as input an original image having a number of pixels (box 500). Next, multiple images corresponding to different levels are generated, such that each level contains a single image (box 510). Each single image at a level has the same number of pixels as the original image. Moreover, each image is a filtered version of the original image.

A width of a filter is varied at each level (box 520). At a first end level (such as the bottom level of the image stack), the width of the filter is narrow. At a second end level (such as the top of the image stack), the filter width is broad. The output of the process is a multi-level image stack containing a sequence of images generated using the process above. The filtering can be performed using any type of filter, such as a Gaussian filter or a box filter.

IV. Operational Details and Results

The multi-level image stack generation process includes two embodiments. A first embodiment uses an iterative generation process to form the multi-level image stack, while a second embodiment uses a parallel generation process. The first embodiment may be preferred when speed is an issue, while the second embodiment may be preferred when higher-quality and parallel implementation are desired. Both of these embodiments will now be discussed in detail.

Figure 2:
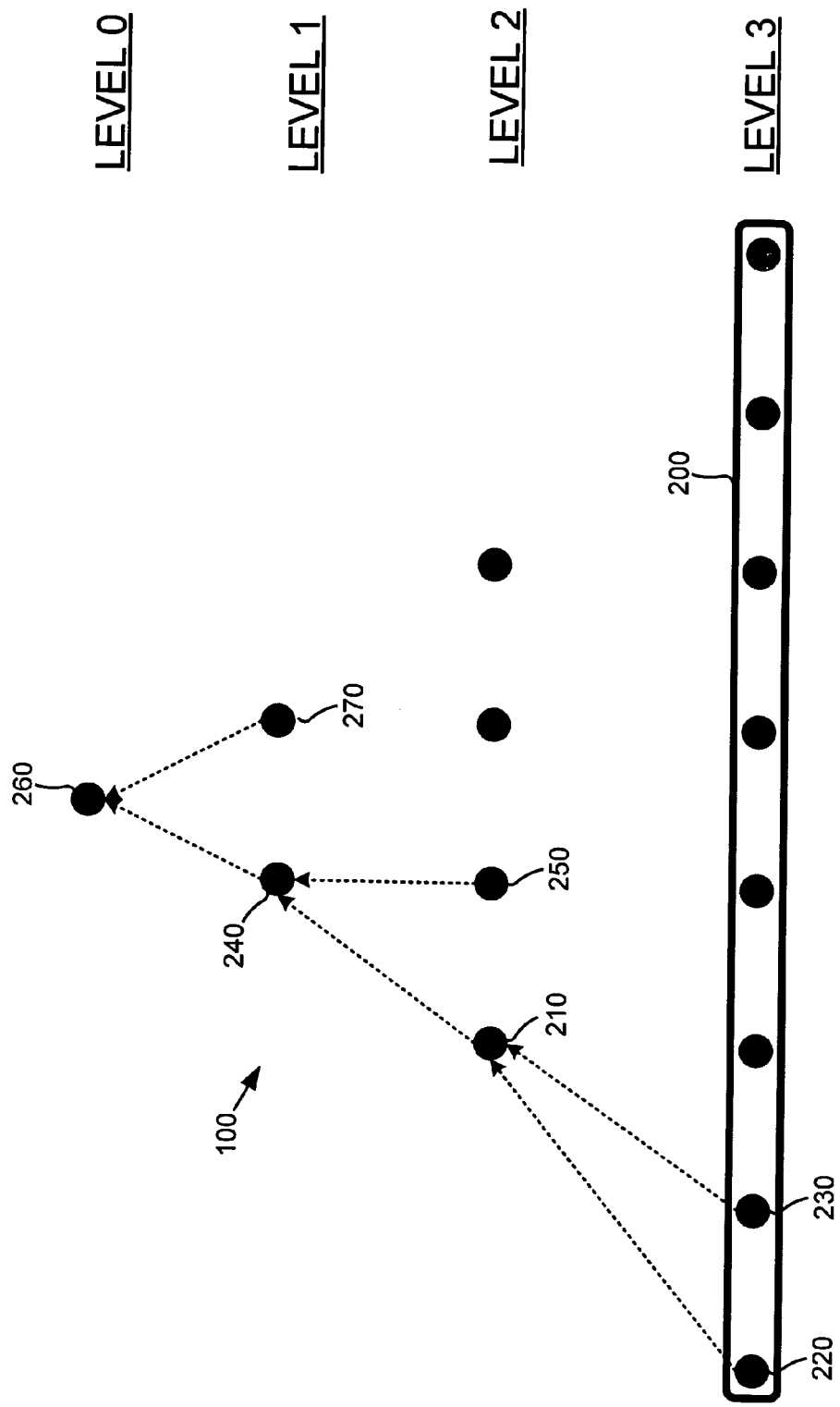
FIG. 2 is a block diagram illustrating a one-dimensional (1-D) representation of successive downsampling of pixels in the mipmap pyramid shown in FIG. 1.
Figure 3:
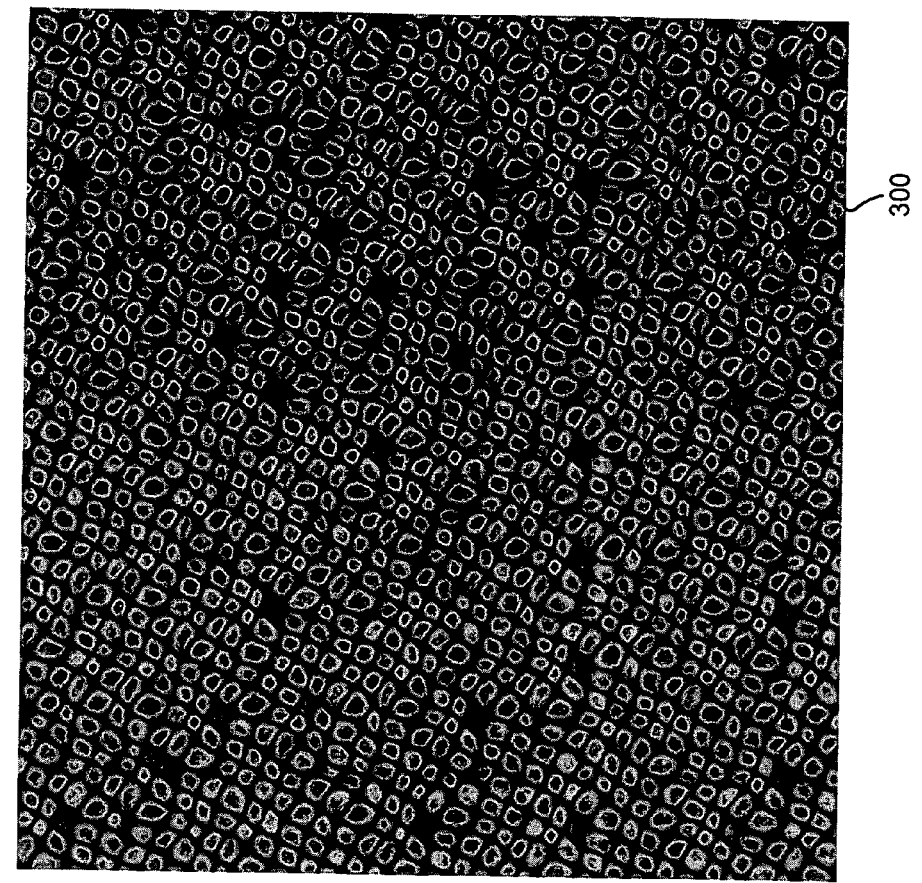
FIG. 3 illustrates an example of spatial quantization that occurs when using a mipmap pyramid in a texture synthesis application.
Figure 3:
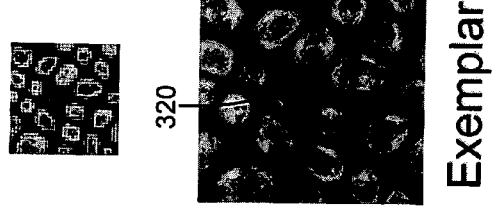
Figure 6A:
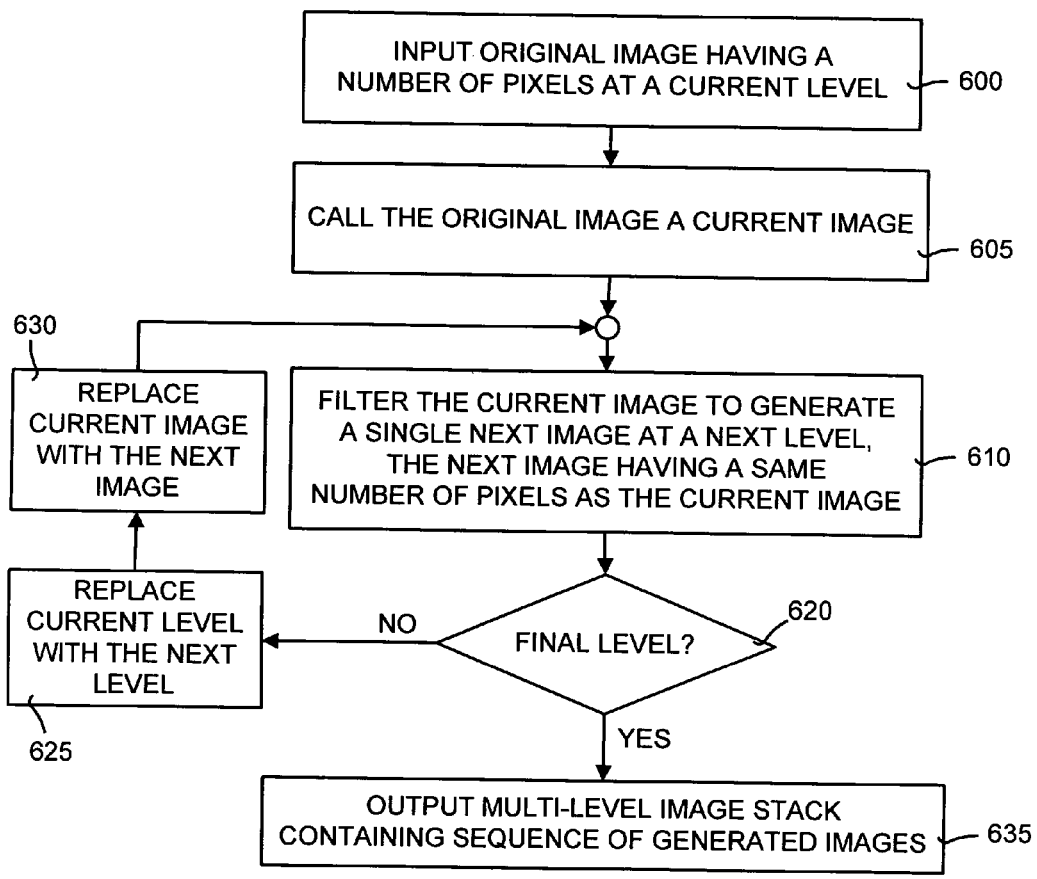
FIG. 6A is a flow diagram illustrating a first embodiment of the multi-level image stack generation method shown in FIG. 5 for iterative generation of a multi-level image stack.

FIG. 6A is a flow diagram illustrating a first embodiment of the multi-level image stack generation method shown in FIG. 5 for iterative generation of a multi-level image stack. In general, the iterative multi-level image stack generation process filters the previous image at a level to generate a filtered image at the next level. Specifically, the iterative multi-level image stack generation process begins by inputting an original image having a number of pixels at a current level (box 600). This original image is at a current level. For example, in the example used in FIGS. 1 and 2 the current level would be Level 3 (assuming an $8^2$ size original image). The original image then is called a current image (box 610).

Next, the current image is filtered to generate a single next image at a next level (box 610). The next image contains the same number of pixels as the current (or original) image. A determination then is made as to whether the process is at a final level (box 620). Generally, a final level is reached when the next image contains the filtered information obtained from all the pixels of the original image. If the final level has not been reached, then the current level is replaced with the next level (box 625). Similarly, the current image is replaced with the next image (box 630).

The process then goes through another iteration to build another level of the multi-level image stack. This iteration includes filtering the current image (box 610) and determining whether the process is at the final level (box 620). If the process is at the final level, then a multi-level image stack containing a sequence of generated images is output (box 635). It should be noted that each level of the multi-level image stack contains a single image, and that single image contains the same number of pixels as the original image.

Figure 6B:
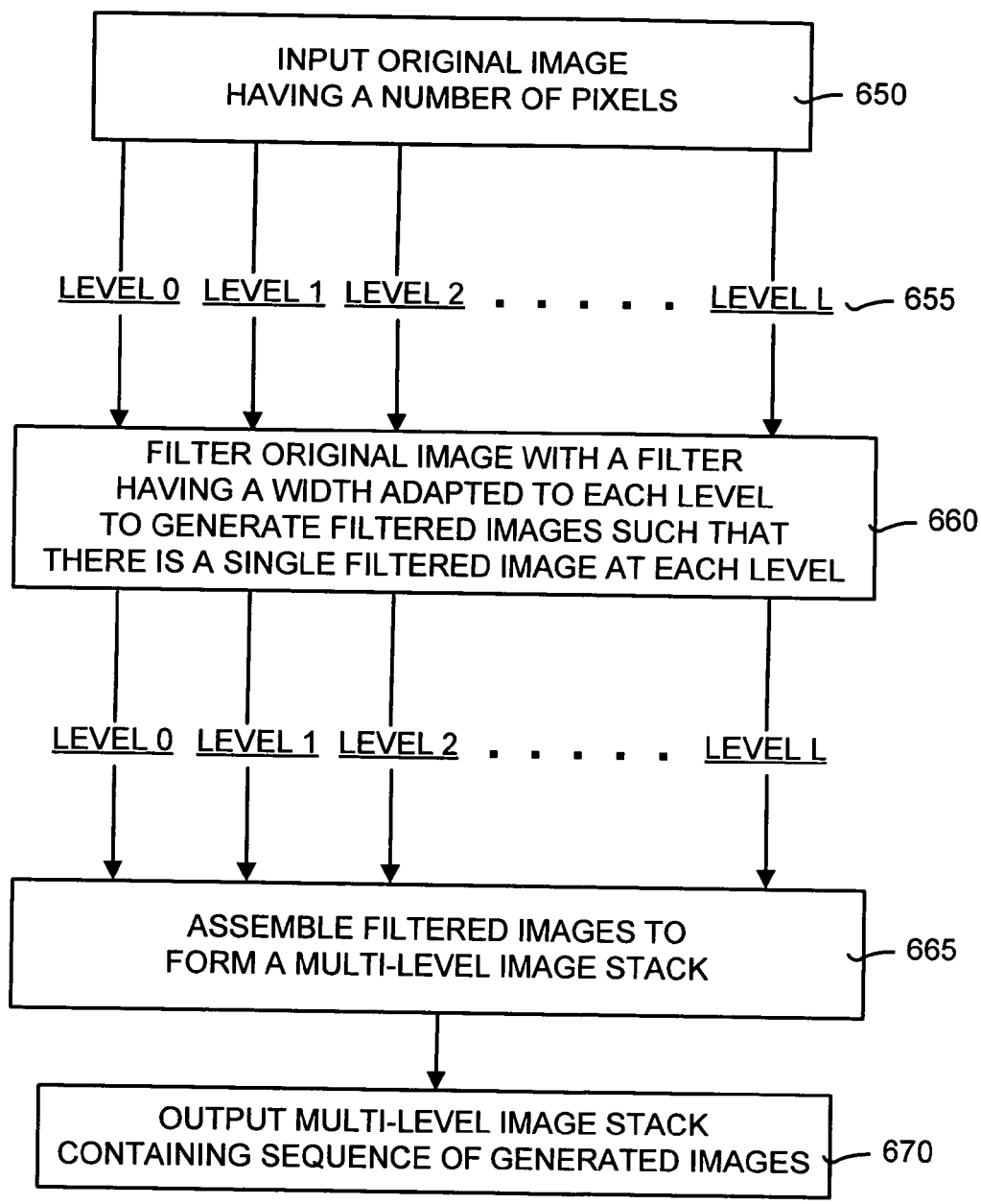
FIG. 6B is a flow diagram illustrating a second embodiment of the multi-level image stack generation method shown in FIG. 5 for parallel generation of a multi-level image stack.

FIG. 6B is a flow diagram illustrating a second embodiment of the multi-level image stack generation method shown in FIG. 5 for parallel generation of a multi-level image stack. In general, the parallel multi-level image stack generation process filters the original image in a parallel process to simultaneously (or nearly simultaneously) generate multiple levels of the image stack. In particular, the parallel multi-level image stack generation process inputs an original image having a number of pixels (box 650). Parallel processing streams 655 then are defined, corresponding to the number of levels in the image stack. The number of levels ranges from Level 0 to Level L.

At each level (and in each parallel processing stream), the original image is filtered to generate filtered images (box 660). This filtering is performed using a filter having a width adapted to each level. For example, at Level L, the filter may be the narrowest filter, while at Level 0 the filter may be the broadest filter. The filtering of the original image to produce each level is performed in parallel. Each level contains a single filtered image. The filtered images are assembled to form a multi-level image stack (box 665). The output is a multi-level image stack containing a sequence of generated images (box 670).

Figure 7:
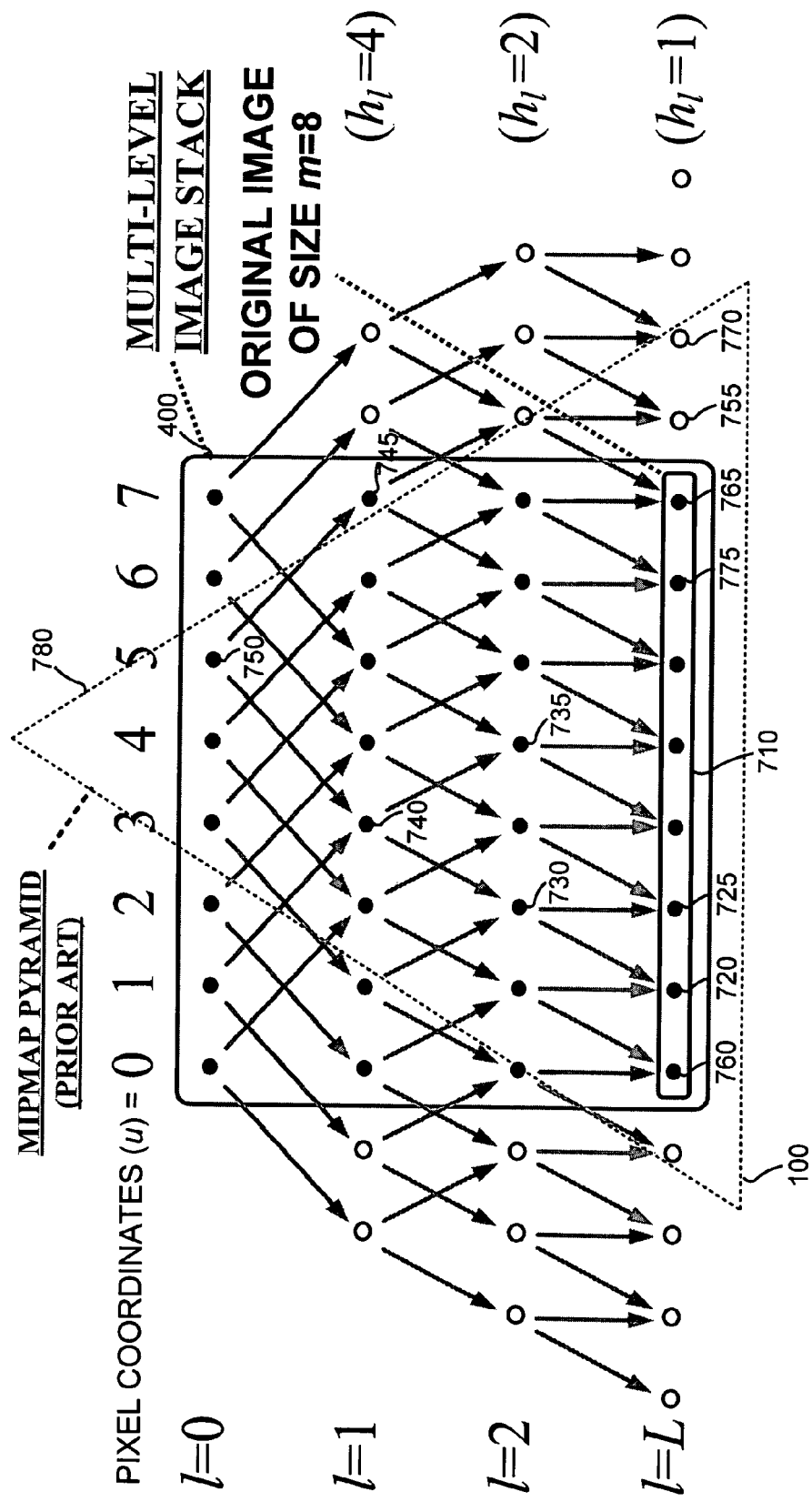
FIG. 7 is a block diagram illustrating a one-dimensional (1-D) generalized representation of the multi-level image stack shown in FIG. 4 and the multi-level generation process shown in FIG. 5.

FIG. 7 is a block diagram illustrating a one-dimensional (1-D) generalized representation of the multi-level image stack 400 shown in FIG. 4 and the multi-level generation process shown in FIG. 5. The multi-level image stack 400 contains a plurality of stacked single images, where each image contains the same number of pixels. In FIG. 7, the term/represents the level of the multi-level image stack 400, m is the size of one side of an image, L is the number of levels in the multi-level image stack 400 (not including the original image), u is the pixel coordinate, and $h_l = 2^{(L-l)}$.

The multi-level image stack 400 contains an original image 710 at level L. In the example shown in FIG. 7, L=3. The original image 710, which is outlined in blue, contains 8 pixels in Level L. A next level is generated by filtering the 8 pixels in the original image 710. As shown in FIG. 7, Level 2 contains a single image that contains the same number of pixels as the original image 710 (or 8 pixels). However, the pixels in Level 2 contain less information that the pixels in the original image 710. This is because the pixels in Level 2 are filtered or blurred at different scales. In the example shown in FIG. 7, this filtering is performed using a box filter, as shown by the arrows. A box filter takes two samples from one level and averages them in the next level. The representation shown in FIG. 7 is a 1-D representation; in 2-D there are 4 pixels averaged per 1 pixel at the next level. Preferably, the filtering is performed using a Gaussian filter, which uses a Gaussian curve to weight the averages of the pixels. Alternatively, filtering can be performed by any one of a number of filtering techniques currently available such as median filtering, diffusion filtering, bilateral filtering, or spline approximation. It should be noted that filtering of the multi-level image stack 400 is performed without subsampling.

Pixels averaged at each level become increasingly farther away from each other as levels having less information are generated. For example, as can be seen by the arrows in FIG. 7, at Level 3 a first pixel 720 and a second pixel 725 are filtered to obtain a third pixel 730 at Level 2. The first pixel 720 and the second pixel 725 are adjacent pixels, or $h_f=2^{L-l}=1$ pixels away, where $h_f$ is the distance between pixels. As noted above, a box filter is shown being used in FIG. 7 in the 1-D case, so that in the 2-D case additional pixels are actually used to obtain the third pixel 730 at level 2, but only the first pixel 720 and the second pixel 725 can be seen in this 1-D view.

At Level 2, the third pixel 730 and a fourth pixel 735 are filtered to obtain a fifth pixel 740 at Level 1. Notice that the third pixel 730 and the fourth pixel 735 are two pixels from each other, or $h_f=2$. At Level 1, the fifth pixel 740 and a sixth pixel 745 are filtered to obtain a seventh pixel 750 at Level 0. From FIG. 7 it can be seen that the fifth pixel 740 and the sixth pixel 745 are separated by four pixels, or $h_f=4$. In FIG. 7, the example where L=3 is shown. Alternatively, the multi-level image stack 400 may contain additional levels, such that the pixel separation between pixels used to obtain additional levels increases by a factor of two for each level until $h_f=m$ at Level 0.

As successive levels of the multi-level image stack 400 are generated, there may be a need to use pixels outside of the image stack 400 in the filtering process. This means that the original image 710 may need to be augmented on all sides to have size 2 m×2 m. In FIG. 7, it can be seen that on each level except Level 0 there are pixels outside of the multi-level image stack 400 that are used in the filtering process. The pixels are called padding, and are shown in FIG. 7 as open (or white-colored) circles outside of the green border 400 illustrating the multi-level image stack 400. The padded samples are only used during the construction of the multi-level image stack, and can be discarded after the construction completes.

In the example used in FIG. 7, a box filter is shown being used in a 1-D representation. For the box filter, at Level 3, the number of padding pixels needed on each side of the image stack 400 is 4 pixels, for a total of 8 pixels at Level 3. At Level 2, the number of padding pixels on each side of the image stack 400 is 3 pixels, for a total of 6 pixels, while at Level 1 the number on each side is 2 pixels, for a total of 4 pixels. At Level 0, there are no padding pixels needed. For the 1-D box filter case shown in FIG. 7, it is sufficient to apply a padding of m/2 pixels on each side to the finest level (or the original) image. For the 2-D box filter case, the padding is m/2 pixels on all four sides. This amounts to 3 $m^2$ padding pixels in total for a box filter ($(2\ m)^2-m^2=3\ m^2$). The size of the padding at coarser levels is derived by the box filter, and each parent pixel takes the average of 2 (or 4 in 2-D) child pixels, so the padding region shrinks. For a Gaussian filter, the necessary padding will be broader.

Additional image samples (or padding pixels) can come from at least one of many sources, including an actual larger image, a tiling if the original image 710 is toroidal, or a reflected or mirrored copy of the original image 710. If the original image 710 is toroidal, then the image 710 wraps around, and padding pixels are not necessary because they are obtained by toroidal access into the image. In this case, an eighth pixel 755 would be the same as a ninth pixel 760, since the image 710 wraps around. If the image 710 is not toroidal, then explicit padding is needed. The padding pixels may be obtained in a variety of ways. One way of generating padding pixels is to use extra samples as needed if the extra samples are available. For example, if the original image 710 is a small window or section of a much larger image, then additional pixels will be available on either side of the original image 710 to serve as padding pixels. Another way of generating padding pixels if additional pixels are not available is to create mirror images just to obtain continuity. In this mirror case, the ninth pixel 755 would be same as a tenth pixel 765, and an eleventh pixel 770 would be the same as a twelfth pixel 775, and so forth.

For purposes of comparison, a 1-D representation of the mipmap pyramid 100 of FIG. 1 is shown in FIG. 7 by the red dashed triangle. The pixels that make up the mipmap pyramid 100 are shown in red. It can be seen that at successively increasing levels of the mipmap pyramid 100 there are fewer and fewer numbers of pixels. For example, Level 3 of the mipmap pyramid 100 contains the same number of pixels as Level 3 of the multi-level image stack 400. In other words, both the mipmap pyramid 100 and the image stack 400 start with the same original image 710. However, at Level 2, the mipmap pyramid 100 contains 4 pixels, at Level 1 it contains 2 pixels, and at Level 0 it contains 1 pixel. In contrast, in the example shown in FIG. 7 the multi-level image stack 400 contains 8 pixels at each level, which is the same amount of pixels contained in the original image 710.

In the image stack 400, the original image 710 is a starting point containing $8^2$ pixels (in the 2-D case) and each of the successive level of the image stack 400 have the same dimensions ($8^2$ pixels) or number of pixels. These successive levels, however, represent filtered or blurred versions of the original image 710, for all the possible filtering window locations within the original image 710. Successive levels have same resolution as the original image 710 in the sense that they have the same spatial extent (or the same number of pixels), but the pixels themselves represent filtered regions that have different extent. For example, in FIG. 7 Level 0 (containing $1^2$ pixels) represents the entire original image 710 blurred to 1 pixel.

One advantage of the multi-level image stack 400 is that addressing is similar to the mipmap pyramid 100. The main difference between the two is that adjacent neighbors (one sample apart) in the mipmap pyramid are located exactly $h_l$ samples away in the image stack. For the application of neighborhood-matching texture synthesis using a multi-resolution mipmap pyramid, the neighborhoods, therefore, must be matched in the synthesized pyramid with neighborhoods in the image stack where the samples in the image stack are spaced at intervals of $h_l$ samples. A coordinate within the image stack 400 can be used to access the mipmap pyramid 100, and vice versa. This makes implementation of the image stack 400 in applications that traditionally use the mipmap pyramid 100 much easier than other types of structures (such as quadtree pyramids).

Figure 8:
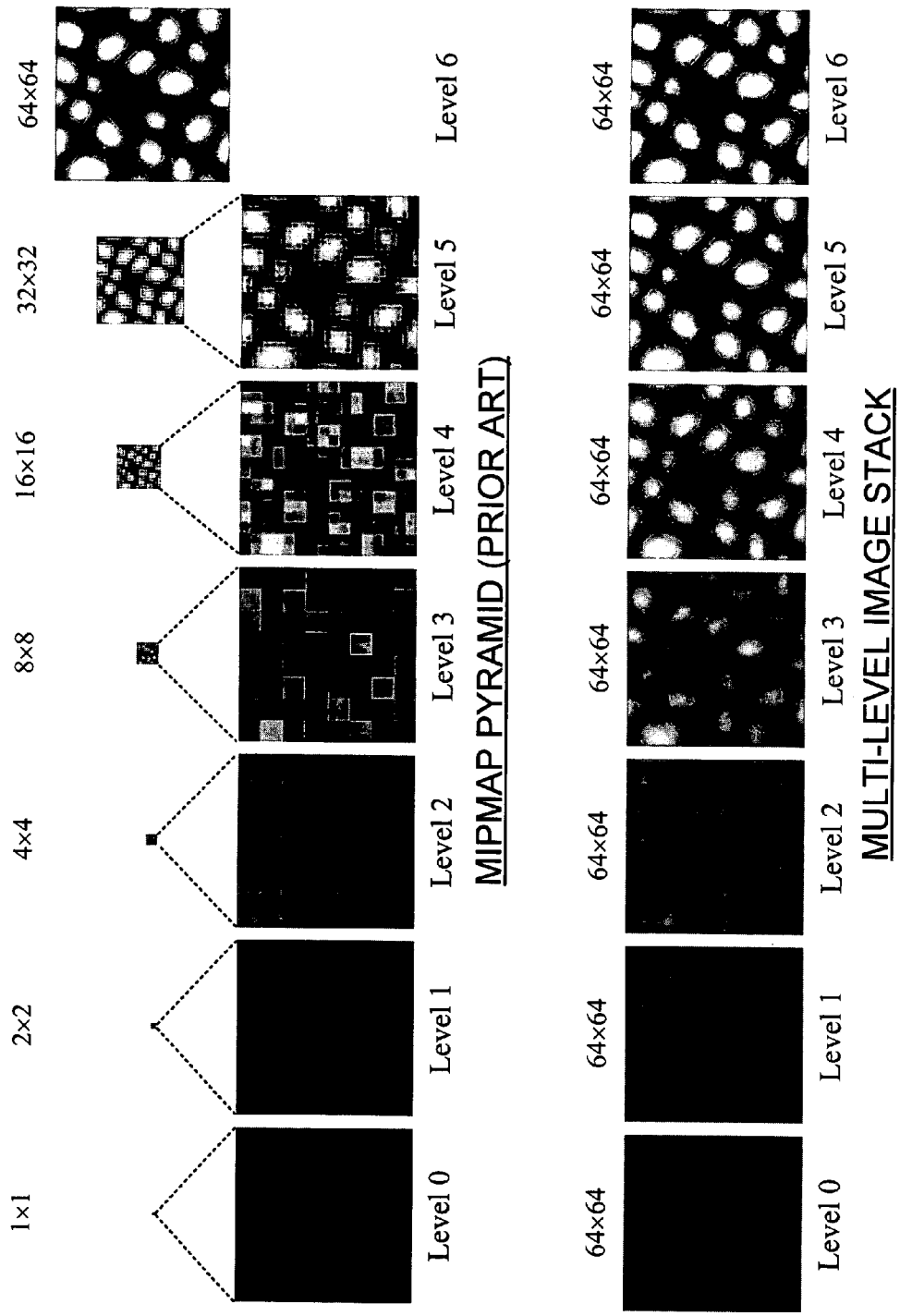
FIG. 8 illustrates a comparison between a multi-level image stack having seven levels (L=6) and the mipmap pyramid at each of the different levels.

FIG. 8 illustrates a comparison between a multi-level image stack having seven levels (L=6) and the mipmap pyramid at each of the different levels. The image stack captures successively larger filter kernels without the subsampling of a mipmap pyramid. At the top two rows of FIG. 8, the traditional mipmap pyramid is shown. At the top row, it can be seen that Level 0 of the mipmap pyramid contains $1^2$ pixel, Level 1 contains $4^2$ pixels, Level 2 contains $8^2$ pixels, Level 3 contains $16^2$ pixels, Level 4 contains $32^2$ pixels, Level 5 contains $32^2$ pixels, and Level 6 contains $64^2$ pixels.

The middle row of FIG. 8 is a close-up or zoomed view of Levels 0 to 5 of the mipmap pyramid. From these zoomed images the original pixels can be seen as separate entities. For example, at Level 0 the entire one pixel is enlarged to show that it represents the entire original image blurred and downsampled to one pixel. At Level 1, each of the 4 pixels can be seen in the enlargement. This continues for each of the levels to Level 5.

The bottom row of FIG. 8 illustrates each level of the multi-level image stack. Each image at each level of the image stack has the same number of pixels. Comparing the bottom row and the middle row, it can be seen that the mipmap pyramid has fewer samples at Levels 0 to 5 than the image stack. This is evident in the zoomed view of the mipmap pyramid, where the individual pixels can be seen at Levels 0 to 5. But in the image stack (on the bottom row), the individual pixels at Levels 0 to 5 cannot be seen.

Figure 9A:
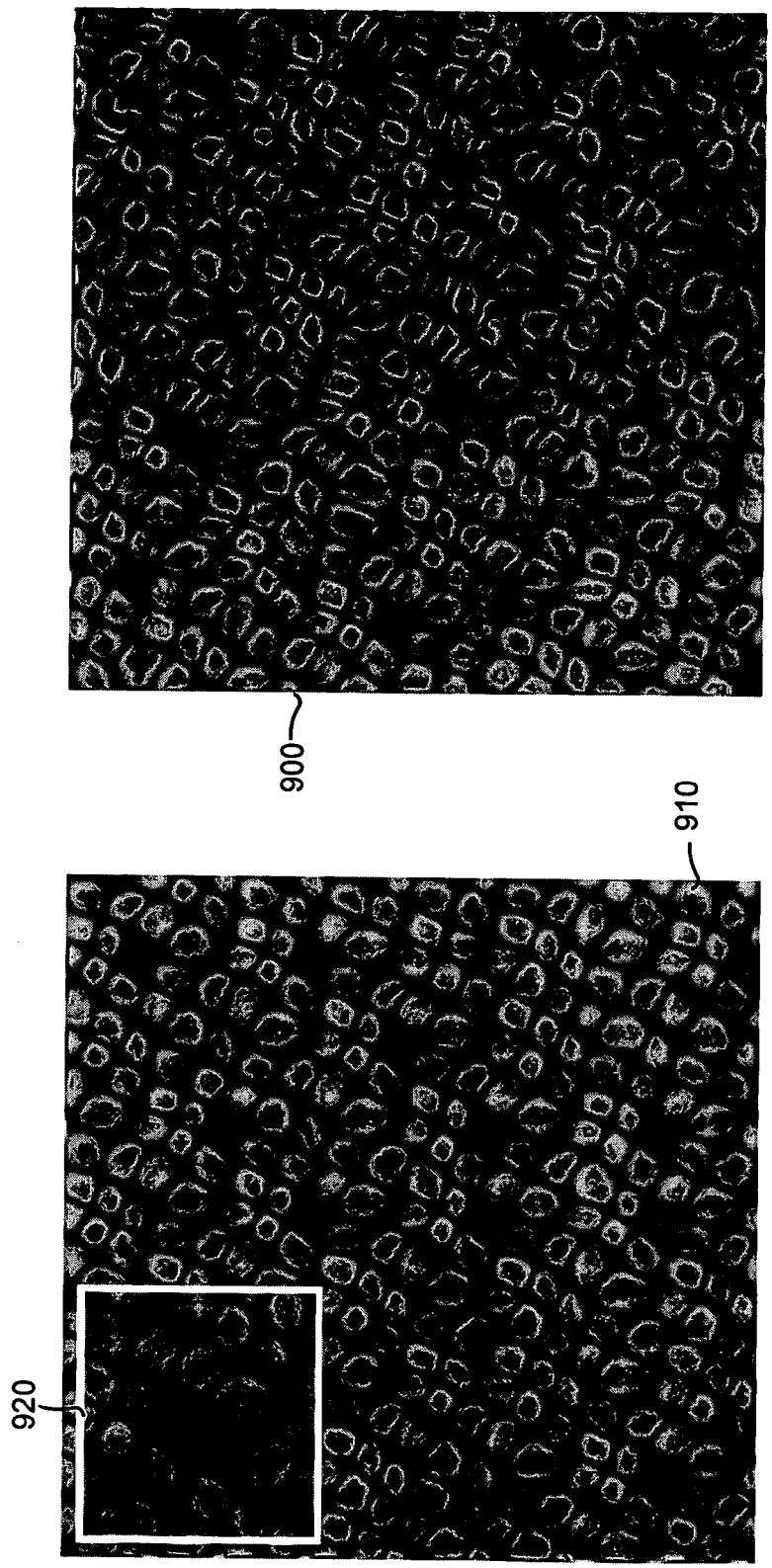
FIG. 9A is a first example from a texture synthesis application illustrating a comparison between results using a multi-level image stack and a mipmap pyramid.
Figure 9B:
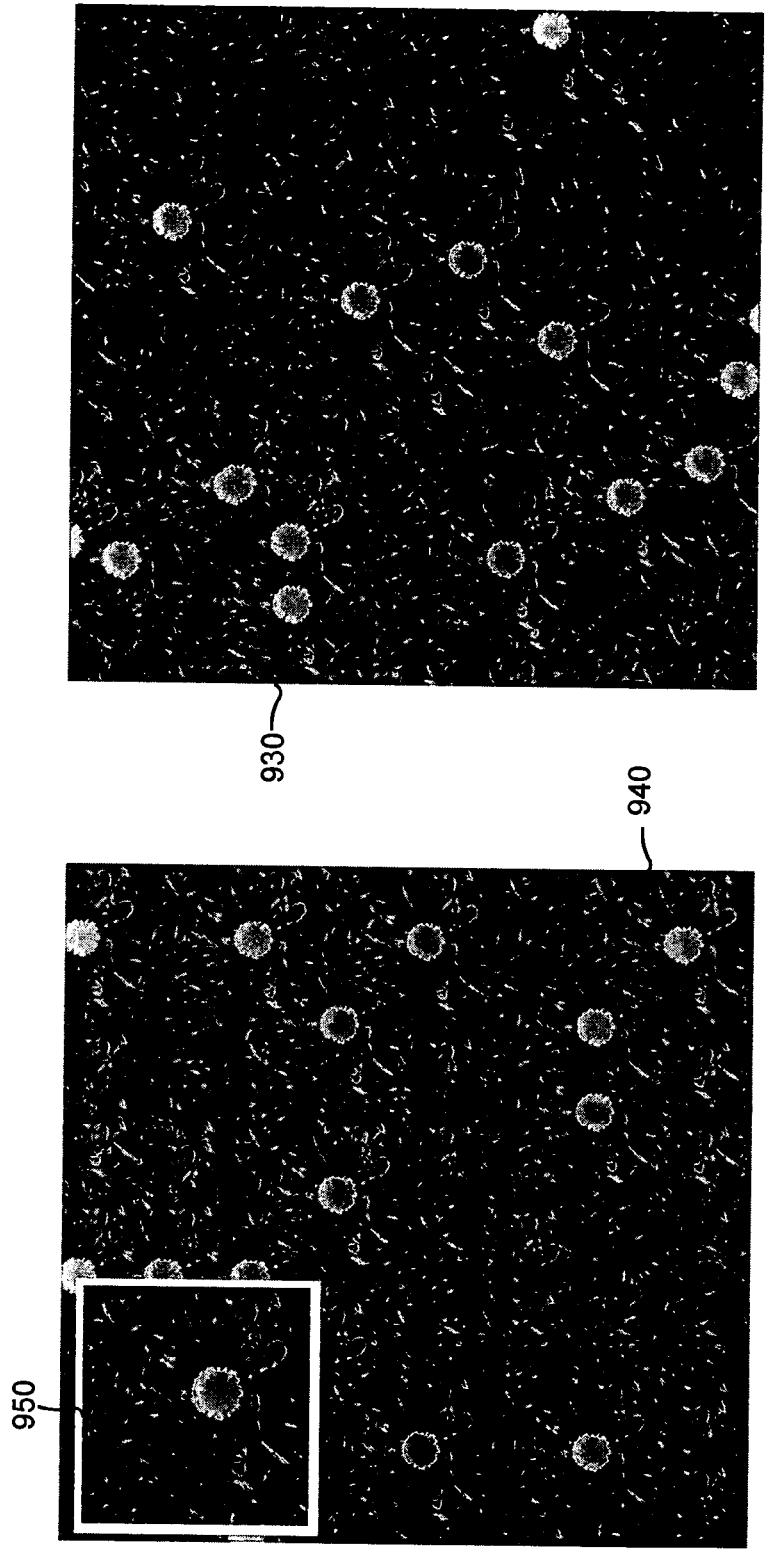
FIG. 9B is a second example from a texture synthesis application illustrating a comparison between results using the multi-level image stack and a mipmap pyramid.

FIGS. 9A and 9B illustrate the improvement in texture synthesis quality due to the multi-level image stack structure. In particular, FIG. 9A is a first example from a texture synthesis application illustrating a comparison between results using a multi-level image stack and a mipmap pyramid. Both an image stack texture image 900 and a mipmap pyramid texture image 910 were constructed from an exemplar 920. It should be noted that the exemplar contains a prominent or significant feature, namely, a red dot. Spatial quantization can be seen in the mipmap pyramid texture image 910, where the red dot appears at several quantized locations. In comparison, the image stack texture image 900 has a much more random spatial placement of the red dot. As stated before, this is due to the fact that each image in the image stack contains the same number of pixels at each level, thereby allowing significant features to be placed at continuous spatial locations in the image stack texture image 900, rather than at quantized locations (as in the mipmap pyramid texture image 910).

FIG. 9B is a second example from a texture synthesis application illustrating a comparison between results using the multi-level image stack and a mipmap pyramid. An image stack texture image 930 and a mipmap pyramid texture image 940 were constructed from an exemplar 950. In this case, the significant feature of the exemplar 950 is a yellow flower. Spatial quantization can be seen in the mipmap pyramid texture image 940, where the yellow flower appears at quantized locations. In comparison, the image stack texture image 900 has a much more random spatial placement of the yellow flower. Compared to a traditional mipmap pyramid, the multi-level image stack structure leads to a more spatially uniform distribution of prominent or significant synthesized texture features.

V. Exemplary Operating Environment

The multi-level image stack and generation method disclosed herein are designed to operate in a computing environment. The following discussion is intended to provide a brief, general description of a suitable computing environment in which the multi-level image stack and generation method may be implemented.

Figure 10:
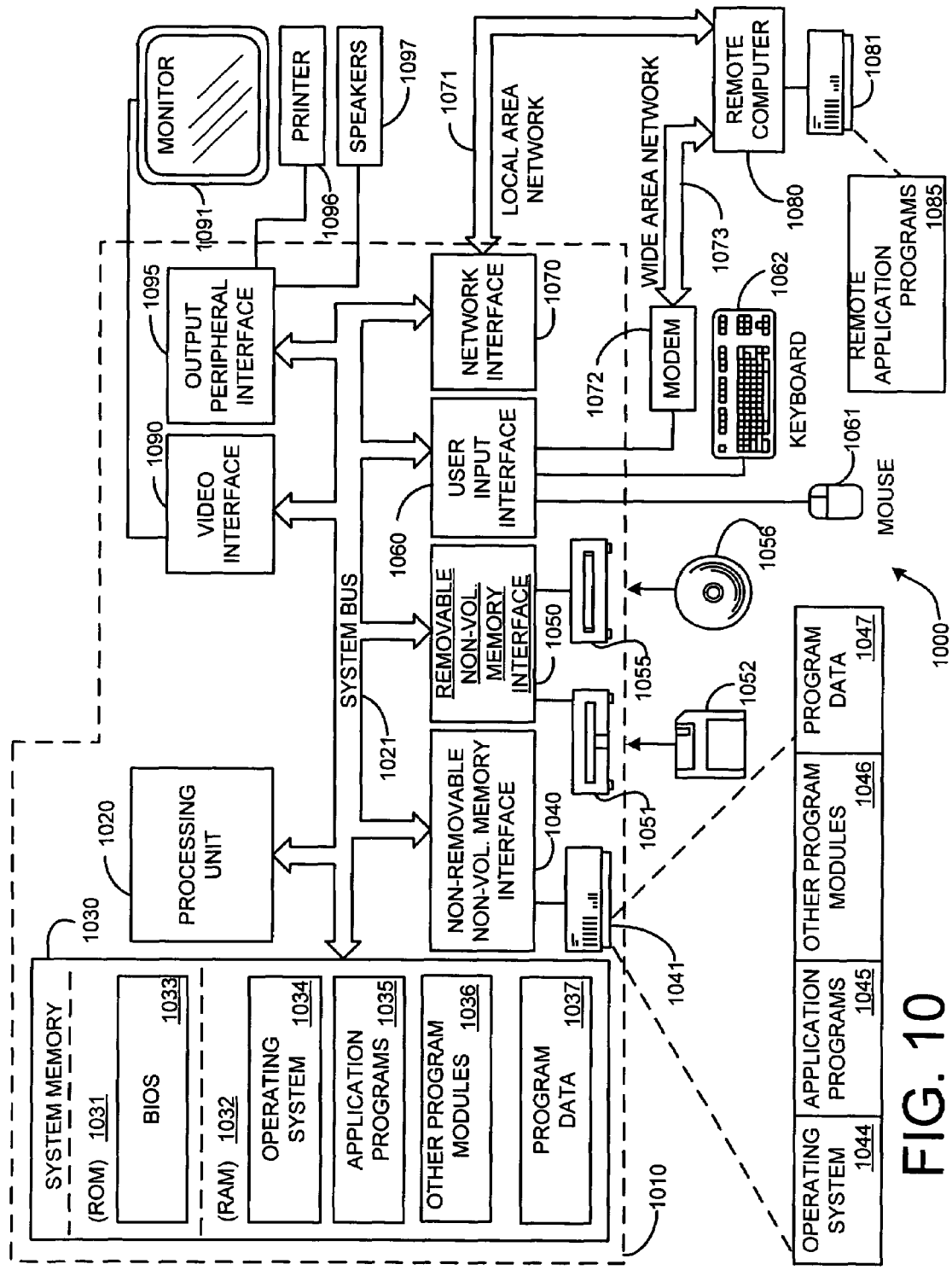
FIG. 10 illustrates an example of a suitable computing system environment in which the multi-level image stack and generation method may be implemented.

FIG. 10 illustrates an example of a suitable computing system environment in which the multi-level image stack and generation method may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The multi-level image stack and generation method is operational with numerous other general purpose or special purpose computing system environments or configurations. Examples of well known computing systems, environments, and/or configurations that may be suitable for use with the multi-level image stack and generation method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The multi-level image stack and generation method may be described in the general context of computer-executable instructions, such as program modules, being executed by a computer. Generally, program modules include routines, programs, objects, components, data structures, etc., that perform particular tasks or implement particular abstract data types. The multi-level image stack and generation method may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for implementing the multi-level image stack and generation method includes a general-purpose computing device in the form of a computer 1010.

Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-readable medium having stored and encoded thereon a multi-level image data structure for performing texture synthesis in a computing device, comprising:
   a single original input image having a number of pixels;
   different levels of images, each level containing a single image having the same number of pixels as the single original input image to form a multi-level image stack, wherein each single image is a filtered version of the single original input image such that an amount of filtering is dependent on the level at which the single image is located; and
   synthesized texture created using the multi-level data structure.

2. The computer-readable medium of claim 1, wherein the filtered version of the original image further comprises using a filter having a width that varies from a narrow width at a one end level of the multi-level image stack to a broad width at another end level of the multi-level image stack.

3. The computer-readable medium of claim 1, wherein the filter is a low-pass filter further comprising at least one of: (1) a box filter; (2) a Gaussian filter.

4. The computer-readable medium of claim 1, wherein each single image at each different level is obtained by one of: (1) an iterative filtering process; (2) a parallel filtering process.

5. The computer-readable medium of claim 1, further comprising padding pixels used to augment each side of the image data structure.

6. A computer-implemented method for generating a multi-level image stack, comprising:
- inputting a single original input image having a number of pixels;
- generating multiple images corresponding to different levels of the multi-level image stack such that each of the multiple images is a filtered version of the single original input image, wherein each level contains a single image having a same number of pixels as the single original input image; and
- varying a spatial extent of a filter at each level to generate the multi-level image stack.

7. The computer-implemented method of claim 6, wherein varying the spatial extent of the filter further comprises varying a filter width at each level from a narrow width at a first end level to a broad width at a second end level.

8. The computer-implemented method of claim 7, wherein the filter is a low-pass filter.

9. The computer-implemented method of claim 7, further comprising:
- calling the original image a current image at a current level; and
- filtering the current image to generate a single next image at a next level, wherein the next image has a same number of pixels as the current image.

10. The computer-implemented method of claim 9, further comprising filtering adjacent pixels in the original image to generate the next image.

11. The computer-implemented method of claim 10, further comprising:
- replacing the current level with the next level;
- replacing the current image with the next image; and
- repeating the filtering of the replaced current image to obtain the different levels of the multi-level image stack 12. The computer-implemented method of claim 11, further comprising filtering pixels that are separated by a separation number of pixels to generate the multiple images corresponding to different levels of the multi-level image, wherein the separation number increases by a factor of two each time another level is generated.

13. The computer-implemented method of claim 6, further comprising padding the multi-level image stack to augment a number of pixels in each image at each of the different levels of the multi-level image stack.

14. The computer-implemented method of claim 6, wherein the filtering process is performed without subsampling.

15. The computer-implemented method of claim 6, further comprising:
- filtering the original image with the filter having a width adapted to each level to generate filtered images such that there is a single filtered image at each level; and
- assembling the filtered images to form the multi-level image stack.

16. The computer-implemented method of claim 15, wherein the filtered image are generated in parallel using a parallel processor.

17. A computer-readable medium storing computer-executable instructions for performing generation of a multi-level image stack, comprising:
- inputting a single original input image containing a number of pixels and a specific content;
- filtering the oriqinal input image to generate multiple levels of the multi-level image stack, wherein each of the multiple levels contains a single image having a same number of pixels as the original input image, and such that each image of the multiple levels is a filtered version of the single original input image containing the same specific content as the single original input image;
- varying a spatial extent of a filter at each of the multiple levels such that the filter has a narrow width at a first end level and a broad width at a second end level; stacking the sequence of filtered images to produce the multi-level image stack;
- varying a spatial extent of filtering the first image on the first level to generate a single second image on a second level having the same number of pixels as the original image; and
- repeating the generation of successive single images at corresponding levels until a final level is reached, wherein each of the successive single images contains the same number of pixels as the original input image.

18. The computer-readable medium of claim 17, wherein filtering the original image to generate multiple levels of the multi-level image stack further comprises using an iterative generation process that generates each of the multiple levels in a sequence of successive filtering iterations such that successive levels encode progressively filtered information of the original image.

19. The computer-readable medium of claim 17, wherein filtering the original image to generate multiple levels of the multi-level image stack further comprises using a parallel generation process that generates each of the multiple levels in parallel by using different filtering operations on the original image by applying a filter of differing spatial extent.

20. The computer-readable medium of claim 17, wherein the filtering is performed without downsampling.

* * * * *